(12) United States Patent
Jain et al.

(10) Patent No.: US 11,223,537 B1
(45) Date of Patent: Jan. 11, 2022

(54) EXECUTING CUSTOM SCRIPTS FROM THE HOST DURING DISASTER RECOVERY

(71) Applicant: Veritas Technologies LLC, Mountain View, CA (US)

(72) Inventors: Ankit Jain, Pune (IN); Sumeet Parmar, Pune (IN); Ashwini Kulkarni, Pune (IN); Swanand Vaidya, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 867 days.

(21) Appl. No.: 15/238,937

(22) Filed: Aug. 17, 2016

(51) Int. Cl.
*H04L 12/24* (2006.01)
*H04L 29/08* (2006.01)

(52) U.S. Cl.
CPC ......... *H04L 41/145* (2013.01); *H04L 41/20* (2013.01); *H04L 67/10* (2013.01)

(58) Field of Classification Search
CPC ......... G06F 9/45558; G06F 2009/4557; G06F 9/4856; G06F 3/065; G06F 2009/45575; G06F 3/0647; G06F 3/0649; G06F 3/0665; G06F 3/0689; G06F 17/30371; G06F 11/1402; G06F 11/1446; G06F 11/1464; G06F 11/1471; G06F 11/203; G06F 11/261; G06F 3/0635; G06F 8/63; G06F 9/45537; G06F 11/1448; G06F 11/2094; G06F 11/3006; G06F 11/301; G06F 11/3082; G06F 11/3089; G06F 17/30079; H04L 67/34; H04L 41/16; H04L 67/1095; H04L 41/042; H04L 69/40; G06Q 10/00; G06Q 10/10
See application file for complete search history.

(56) References Cited

U.S. PATENT DOCUMENTS

| 5,339,432 A | 8/1994 | Crick |
| 5,598,563 A | 1/1997 | Spies |
| 5,649,090 A | 7/1997 | Edwards et al. |
| (Continued) | | |

FOREIGN PATENT DOCUMENTS

| JP | H11296375 A | 10/1999 |
| JP | 2003288216 A | 10/2003 |

OTHER PUBLICATIONS

"Accelerating Dell PowerEdge Server Migration with Symantec Backup Exec System Recovery", Dell Power Solutions, Aug. 2006, pp. 62-64.

(Continued)

*Primary Examiner* — Greg C Bengzon
(74) *Attorney, Agent, or Firm* — Rory D. Rankin; Kowert, Hood, Munyon, Rankin & Goetzel, P.C

(57) ABSTRACT

Systems, apparatuses, methods, and computer readable mediums for executing scripts within migrated hosts. The system enables a user to generate a task to execute a script on a host after the host has been migrated from a first data center to a second data center. This task may identify the host using a first ID of the host on the first data center. The host may be migrated to the second data center, with the host being identified on the second data center using a second ID. The system stores a correlation between the first ID and the second ID of the host. The system utilizes the second ID to retrieve a third ID for communicating with the host on the second data center to cause the host to execute the script on the second data center.

20 Claims, 11 Drawing Sheets

(56) References Cited

U.S. PATENT DOCUMENTS

| | | |
|---|---|---|
| 5,649,196 A | 7/1997 | Woodhill et al. |
| 5,673,382 A | 9/1997 | Cannon et al. |
| 5,708,604 A | 1/1998 | Fontana et al. |
| 5,708,654 A | 1/1998 | Arndt et al. |
| 5,715,456 A | 2/1998 | Bennett et al. |
| 5,732,282 A | 3/1998 | Provino et al. |
| 5,802,365 A | 9/1998 | Kathail et al. |
| 5,819,107 A | 10/1998 | Lichtman et al. |
| 5,835,953 A | 11/1998 | Ohran |
| 5,845,295 A | 12/1998 | Houseman et al. |
| 5,890,204 A | 3/1999 | Ofer et al. |
| 5,974,474 A | 10/1999 | Furner et al. |
| 5,991,542 A | 11/1999 | Han et al. |
| 6,023,585 A | 2/2000 | Perlman et al. |
| 6,078,990 A | 6/2000 | Frazier |
| 6,080,207 A | 6/2000 | Kroening et al. |
| 6,138,178 A | 10/2000 | Watanabe |
| 6,170,055 B1 | 1/2001 | Meyer et al. |
| 6,185,686 B1 | 2/2001 | Glover |
| 6,247,128 B1 | 6/2001 | Fisher et al. |
| 6,279,011 B1 | 8/2001 | Muhlestein |
| 6,304,882 B1 | 10/2001 | Strellis et al. |
| 6,330,690 B1 | 12/2001 | Nouri et al. |
| 6,346,954 B1 | 2/2002 | Chu et al. |
| 6,389,433 B1 | 5/2002 | Bolosky et al. |
| 6,513,051 B1 | 1/2003 | Bolosky et al. |
| 6,535,998 B1 | 3/2003 | Cabrera et al. |
| 6,567,860 B1 | 5/2003 | Maxwell et al. |
| 6,594,690 B2 | 7/2003 | Cantwell et al. |
| 6,640,291 B2 | 10/2003 | Fujibayashi et al. |
| 6,654,769 B2 | 11/2003 | Ito et al. |
| 6,654,830 B1 | 11/2003 | Taylor et al. |
| 6,671,749 B2 | 12/2003 | Williams et al. |
| 6,671,778 B2 | 12/2003 | Naberhuis et al. |
| 6,681,323 B1 | 1/2004 | Fontanesi et al. |
| 6,725,715 B2 | 4/2004 | Igarashi et al. |
| 6,727,920 B1 | 4/2004 | Vineyard, Jr. et al. |
| 6,732,294 B2 | 5/2004 | Mackrory et al. |
| 6,735,715 B1 | 5/2004 | Graham |
| 6,745,207 B2 | 6/2004 | Reuter et al. |
| 6,748,429 B1 | 6/2004 | Talluri et al. |
| 6,760,787 B2 | 7/2004 | Forin |
| 6,804,774 B1 | 10/2004 | Larvoire et al. |
| 6,820,035 B1 | 11/2004 | Zahavi |
| 6,820,214 B1 | 11/2004 | Cabrera et al. |
| 6,836,830 B1 | 12/2004 | Yamagami et al. |
| 6,889,157 B2 | 5/2005 | Mutchler et al. |
| 6,920,537 B2 | 7/2005 | Ofek et al. |
| 6,925,541 B2 | 8/2005 | Yamagami et al. |
| 6,928,644 B1 | 8/2005 | Kroening et al. |
| 6,954,824 B2 | 10/2005 | Burton et al. |
| 6,981,177 B2 | 12/2005 | Beattie |
| 6,999,913 B2 | 2/2006 | Hensley |
| 7,007,144 B2 | 2/2006 | Nakanishi et al. |
| 7,010,624 B1 | 3/2006 | Zhou et al. |
| 7,013,372 B2 | 3/2006 | Achiwa et al. |
| 7,024,581 B1 | 4/2006 | Wang et al. |
| 7,062,764 B2 | 6/2006 | Cohen et al. |
| 7,065,769 B1 | 6/2006 | Tolopka |
| 7,069,402 B2 | 6/2006 | Coulter et al. |
| 7,076,536 B2 | 7/2006 | Chiloyan et al. |
| 7,093,086 B1 | 8/2006 | van Rietschote |
| 7,107,292 B1 | 9/2006 | Hrle et al. |
| 7,107,534 B1 | 9/2006 | de Jong et al. |
| 7,155,585 B2 | 12/2006 | Lam et al. |
| 7,164,809 B2 | 1/2007 | Beyrouti |
| 7,168,003 B2 | 1/2007 | Lozano et al. |
| 7,185,336 B2 | 2/2007 | Vaughan et al. |
| 7,200,604 B2 | 4/2007 | Forman et al. |
| 7,213,060 B2 | 5/2007 | Kemp et al. |
| 7,216,344 B2 | 5/2007 | Cobb et al. |
| 7,287,257 B2 | 10/2007 | Meza et al. |
| 7,293,272 B1 | 11/2007 | Okcu et al. |
| 7,322,010 B1 | 1/2008 | Mikula |
| 7,330,967 B1 | 2/2008 | Pujare et al. |
| 7,334,157 B1 | 2/2008 | Graf et al. |
| 7,334,227 B2 | 2/2008 | Kim et al. |
| 7,340,638 B2 | 3/2008 | Nicholson et al. |
| 7,356,679 B1 | 4/2008 | Le et al. |
| 7,359,920 B1 | 4/2008 | Rybicki et al. |
| 7,392,423 B2 | 6/2008 | Henrickson |
| 7,395,533 B2 | 7/2008 | Suzuki |
| 7,401,113 B1 | 7/2008 | Appiah et al. |
| 7,424,514 B2 | 9/2008 | Noble et al. |
| 7,424,719 B2 | 9/2008 | Duplichan |
| 7,448,034 B2 | 11/2008 | Anderson et al. |
| 7,457,831 B2 | 11/2008 | Orleth et al. |
| 7,478,113 B1 | 1/2009 | De Spiegeleer et al. |
| 7,480,793 B1 | 1/2009 | Marsh |
| 7,529,920 B2 | 5/2009 | Hirai |
| 7,536,486 B2 | 5/2009 | Sadovsky et al. |
| 7,600,227 B2 | 10/2009 | Brockway et al. |
| 7,631,054 B2 | 12/2009 | French et al. |
| 7,676,803 B2 | 3/2010 | Zhao et al. |
| 7,680,957 B1 | 3/2010 | Ketterhagen et al. |
| 7,694,030 B2 | 4/2010 | Sadovsky et al. |
| 7,716,382 B2 | 5/2010 | Smith, IV et al. |
| 7,743,242 B2 | 6/2010 | Oberhaus et al. |
| 7,769,971 B2 | 8/2010 | Cremelie et al. |
| 7,769,990 B1 | 8/2010 | Okcu et al. |
| 7,886,185 B1 | 2/2011 | Okcu et al. |
| 7,941,814 B1 | 5/2011 | Okcu et al. |
| 8,132,186 B1 | 3/2012 | Okcu et al. |
| 8,359,491 B1 | 1/2013 | Bloomstein |
| 8,438,136 B2 | 5/2013 | Ohr et al. |
| 9,069,607 B1 * | 6/2015 | Gopalakrishna Alevoor ............ G06F 9/45558 |
| 9,146,769 B1 * | 9/2015 | Shankar ............ G06F 9/45558 |
| 9,223,606 B1 * | 12/2015 | Vaidya ............ G06F 9/45558 |
| 9,612,767 B2 * | 4/2017 | Huang ............ G06F 3/0647 |
| 9,632,814 B2 * | 4/2017 | Bonilla ............ G06F 3/067 |
| 9,633,406 B2 * | 4/2017 | Bala ............ G06T 1/00 |
| 9,722,858 B2 * | 8/2017 | Markley ............ H04L 41/04 |
| 9,736,013 B2 * | 8/2017 | Markley ............ H04L 41/04 |
| 2002/0019908 A1 | 2/2002 | Reuter et al. |
| 2002/0091710 A1 | 7/2002 | Dunham et al. |
| 2002/0095501 A1 | 7/2002 | Chiloyan et al. |
| 2002/0174139 A1 | 11/2002 | Midgley et al. |
| 2003/0018692 A1 | 1/2003 | Ebling et al. |
| 2003/0074527 A1 | 4/2003 | Burton et al. |
| 2003/0088428 A1 | 5/2003 | Singhal |
| 2003/0093444 A1 | 5/2003 | Huxoll |
| 2003/0120624 A1 | 6/2003 | Poppenga et al. |
| 2003/0120751 A1 | 6/2003 | Husain et al. |
| 2003/0126202 A1 | 7/2003 | Watt |
| 2003/0154199 A1 | 8/2003 | Thomas et al. |
| 2003/0159070 A1 | 8/2003 | Mayer et al. |
| 2003/0163809 A1 | 8/2003 | Bantz et al. |
| 2003/0195951 A1 | 10/2003 | Wittel, Jr. et al. |
| 2003/0195995 A1 | 10/2003 | Tabbara |
| 2004/0003135 A1 | 1/2004 | Moore |
| 2004/0091175 A1 | 5/2004 | Beyrouti |
| 2004/0098717 A1 | 5/2004 | Husain et al. |
| 2004/0111250 A1 | 6/2004 | Hensley |
| 2004/0139128 A1 | 7/2004 | Becker et al. |
| 2004/0221146 A1 | 11/2004 | Baumann |
| 2004/0267973 A1 | 12/2004 | Sumida et al. |
| 2005/0010588 A1 | 1/2005 | Zalewski et al. |
| 2005/0044096 A1 | 2/2005 | Caliendo, Jr. et al. |
| 2005/0102578 A1 | 5/2005 | Bliss et al. |
| 2005/0125426 A1 | 6/2005 | Minematsu |
| 2005/0125460 A1 | 6/2005 | Yu et al. |
| 2005/0149924 A1 | 7/2005 | Komarla et al. |
| 2005/0216784 A1 | 9/2005 | Srinivasan et al. |
| 2005/0216912 A1 | 9/2005 | Cox et al. |
| 2005/0223386 A1 | 10/2005 | Suthapong |
| 2006/0059327 A1 | 3/2006 | Brown et al. |
| 2006/0112311 A1 | 5/2006 | Cobb |
| 2006/0190766 A1 * | 8/2006 | Adler ............ G06F 11/2025 714/13 |
| 2006/0221370 A1 | 10/2006 | Iida |
| 2006/0232810 A1 | 10/2006 | Kishino |
| 2007/0050423 A1 | 3/2007 | Whalen et al. |
| 2007/0067843 A1 | 3/2007 | Williamson et al. |

(56) References Cited

U.S. PATENT DOCUMENTS

| | | | |
|---|---|---|---|
| 2007/0101342 A1 | 5/2007 | Flegg et al. | |
| 2007/0106984 A1 | 5/2007 | Birk Olsen et al. | |
| 2007/0168478 A1 | 7/2007 | Crosbie | |
| 2007/0214198 A1 | 9/2007 | Fontenot et al. | |
| 2007/0220512 A1 | 9/2007 | Pfahler | |
| 2008/0016387 A1 | 1/2008 | Bensinger | |
| 2008/0091929 A1 | 4/2008 | Oberhaus et al. | |
| 2008/0126444 A1 | 5/2008 | van Ingen et al. | |
| 2008/0155302 A1 | 6/2008 | Mue | |
| 2008/0168477 A1 | 7/2008 | Flegg et al. | |
| 2008/0320466 A1 | 12/2008 | Dias | |
| 2009/0055507 A1* | 2/2009 | Oeda | G06F 9/4856 709/216 |
| 2009/0157882 A1* | 6/2009 | Kashyap | H04L 69/16 709/227 |
| 2010/0115080 A1* | 5/2010 | Kageyama | H04L 29/12028 709/223 |
| 2010/0332629 A1* | 12/2010 | Cotugno | G06F 9/5072 709/221 |
| 2011/0197189 A1* | 8/2011 | Wagner | G06F 11/3006 718/1 |
| 2011/0225095 A1* | 9/2011 | Gawali | G06F 11/2023 705/300 |
| 2011/0276951 A1* | 11/2011 | Jain | G06F 11/3006 717/140 |
| 2012/0054731 A1* | 3/2012 | Aravamudan | G06F 8/63 717/170 |
| 2012/0084769 A1* | 4/2012 | Adi | G06F 8/63 717/174 |
| 2012/0137285 A1* | 5/2012 | Glikson | G06F 9/4856 718/1 |
| 2013/0007216 A1* | 1/2013 | Fries | G06F 9/4856 709/218 |
| 2013/0060929 A1* | 3/2013 | Koponen | H04L 12/4633 709/224 |
| 2013/0124807 A1* | 5/2013 | Nielsen | G06F 11/1438 711/162 |
| 2014/0040888 A1* | 2/2014 | Bookman | G06F 9/4856 718/1 |
| 2014/0146055 A1* | 5/2014 | Bala | G06F 11/1402 345/501 |
| 2014/0149494 A1* | 5/2014 | Markley | H04L 67/34 709/203 |
| 2014/0149983 A1* | 5/2014 | Bonilla | G06F 9/45558 718/1 |
| 2014/0165060 A1* | 6/2014 | Muller | G06F 9/45533 718/1 |
| 2014/0201735 A1* | 7/2014 | Kannan | G06F 9/45558 718/1 |
| 2015/0032817 A1* | 1/2015 | Garg | H04L 67/10 709/204 |
| 2015/0052521 A1* | 2/2015 | Raghu | H04L 63/0272 718/1 |
| 2015/0052523 A1* | 2/2015 | Raghu | G06F 9/45533 718/1 |
| 2015/0052524 A1* | 2/2015 | Raghu | G06F 9/455 718/1 |
| 2015/0096011 A1* | 4/2015 | Watt | H04L 63/0272 726/15 |
| 2015/0195128 A1* | 7/2015 | Kim | G06F 9/45558 709/220 |
| 2015/0207703 A1* | 7/2015 | Gallagher | G06F 11/3006 709/224 |
| 2015/0261514 A1* | 9/2015 | Fu | G06F 9/45558 718/1 |
| 2015/0281347 A1* | 10/2015 | Wang | G06F 9/5027 709/203 |
| 2015/0293760 A1* | 10/2015 | Alevoor | G06F 9/45558 717/169 |
| 2015/0324215 A1* | 11/2015 | Borthakur | G06F 9/45558 718/1 |
| 2015/0324217 A1* | 11/2015 | Shilmover | G06F 9/45558 718/1 |
| 2015/0370640 A1* | 12/2015 | Paskalev | G06F 11/1484 714/15 |
| 2015/0378766 A1* | 12/2015 | Beveridge | G06F 9/45558 718/1 |
| 2016/0048408 A1* | 2/2016 | Madhu | G06F 11/1458 718/1 |
| 2016/0092127 A1* | 3/2016 | Markley | G06F 3/065 711/162 |
| 2016/0094624 A1* | 3/2016 | Mordani | H04L 47/76 709/203 |
| 2016/0139945 A1* | 5/2016 | Griffith | G06F 9/5055 711/162 |
| 2016/0142261 A1* | 5/2016 | Huang | G06F 3/0647 709/223 |
| 2016/0156568 A1* | 6/2016 | Naganuma | H04L 47/70 709/226 |
| 2016/0216895 A1* | 7/2016 | Bhuyan | G06F 3/0605 |
| 2016/0277509 A1* | 9/2016 | Qiang | H04L 67/16 |
| 2016/0285734 A1* | 9/2016 | Dempo | G06F 9/4856 |
| 2016/0364252 A1* | 12/2016 | Graf | G06F 9/44505 |
| 2016/0366233 A1* | 12/2016 | Le | H04L 67/16 |
| 2017/0228248 A1* | 8/2017 | Bala | G06F 9/45558 |

OTHER PUBLICATIONS

Bhatt, Umesh, U.S. Appl. No. 12/573,006, entitled "Systems and Methods for Automatically Updating a Driver Database Associated With a Recovery Service", filed Oct. 2, 2009, 35 pages.

"Data Sheet: Backup and Recovery—Symantec Backup Exec™ System Recovery", Mar. 2007, 6 pages, Symantec Corporation.

"How to Perform a True Image Restore", Symantec.com, Nov. 15, 2004, 5 pages, http://seer.entsupport.symantec.com/docs/267780.html.

\* cited by examiner

VM Table 305

| VM Name | VMID | Host ID (UUID) |
|---|---|---|
| webserver_abcvm10 | abcvm10_vmid | abc_hostid |
| webserver_abcvm10_target | abcvm10_vmid_target | abc_hostid_target |
| ... | ... | ... |

VM Correlation Table 315

| Source VMID | Target VMID |
|---|---|
| abcvm10_vmid | abcvm10_vmid_target |
| ... | ... |

Host Table 310

| Host ID | Host Name | IP |
|---|---|---|
| abc_hostid | abc.veritas.com | 10.2.200.12 |
| abc_hostid_target | abc.veritas.com | 100.2.32.12 |
| ... | ... | ... |

*FIG. 3*

EXECUTING CUSTOM SCRIPTS FROM THE HOST DURING DISASTER RECOVERY

BACKGROUND

Technical Field

Embodiments described herein relate to disaster recovery and more particularly, to executing custom scripts from hosts across disaster recovery sites.

Description of the Related Art

Running custom scripts in a disaster recovery process typically relies on manual intervention. If custom script execution is to be governed from a central entity, then multiple copies of the custom script will be maintained. For example, a user may maintain a script in the cloud, and the user would need network access to download the script from the cloud during the disaster recovery process. Also, when the user makes changes to the script, the user would need to manually update the cloud version of the script with these changes. Also, scripts are not context aware as to whether the script is running for migrate or takeover operations.

SUMMARY

Systems, apparatuses, and methods for executing scripts on hosts as part of disaster recovery operations are disclosed.

In one embodiment, a system includes a plurality of data centers and one or more networks coupling together the plurality of data centers. In one embodiment, at least one of the plurality of data centers is a cloud data center. The system is configured to generate a user interface to enable a user or administrator to create plans for various disaster recovery operations. The user or administrator can include any number of tasks within a given plan, including tasks for migrating a host or a group of hosts, tasks for executing scripts on a host before or after migration, and other tasks. As used herein, the term "host" may be defined as a virtual machine, physical machine, operating system, application, or the like.

In one embodiment, the system detects a request to execute a script as part of a host in a first data center, with the host having a first identifier (ID) in the first data center. In one embodiment, the request to execute the script is specified within a task of a user-generated plan. The script may be a user-created list of commands to be executed, a binary, or other executable. In response to detecting the request to execute the script on the host, the system communicates with the host to cause the host to execute the script.

At a later point in time, the system migrates the host to a second data center as part of a user-defined plan, a rehearsal event, or a disaster recovery event. When the host is migrated to the second data center, the host is assigned a second ID on the second data center. The system stores a correlation between the first ID of the host on the first data center and the second ID of the host on the second data center. In one embodiment, the correlation is stored in a database. After migrating the host, the system may detect a request to execute the script as part of the host on the second data center. In one embodiment, the request identifies the host using the first ID. Next, the system retrieves the correlation between the first ID and the second ID of the host. Then, the system correlates the second ID to a third ID utilized for communicating with the host. Then, the system utilizes the third ID to communicate with the host and cause the host to execute the script on the second data center.

In one embodiment, a system is configured to pass a context of a disaster recovery operation to the script when the script is executed on the host on the second data center. In one embodiment, the context indicates whether the disaster recovery operation is a migration or a takeover operation. In other embodiments, other arguments and/or parameters can be passed as inputs to the script when the script is executed on the host on the second data center.

In one embodiment, a primary data center includes a resiliency platform application communicating with an agent within a host. In one embodiment, the resiliency platform application utilizes credentials to connect to the agent and establish authentication based on a unique user identifier (UUID). The host also has a first virtual machine identifier (VMID) on the primary data center. When the host is migrated and launched on a secondary data center, the agent generates a new UUID for the host, with the agent using the new UUID to communicate with a resiliency platform application running on the secondary data center. The host will also have a second VMID on the secondary data center, and the platform stores a correlation between the first VMID of the host on the primary data center and the second VMID of the host on the secondary data center. When a plan is executed with a task that identifies the host using the first VMID, the platform retrieves the correlation to translate the first VMID into the second VMID. Next, the platform identifies the new UUID correlated with the second VMID, and then the platform utilizes the new UUID to communicate with the host and cause the host to execute one or more scripts.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 3 illustrates correlation tables in accordance with one or more embodiments.

DETAILED DESCRIPTION OF EMBODIMENTS

Figure 1:
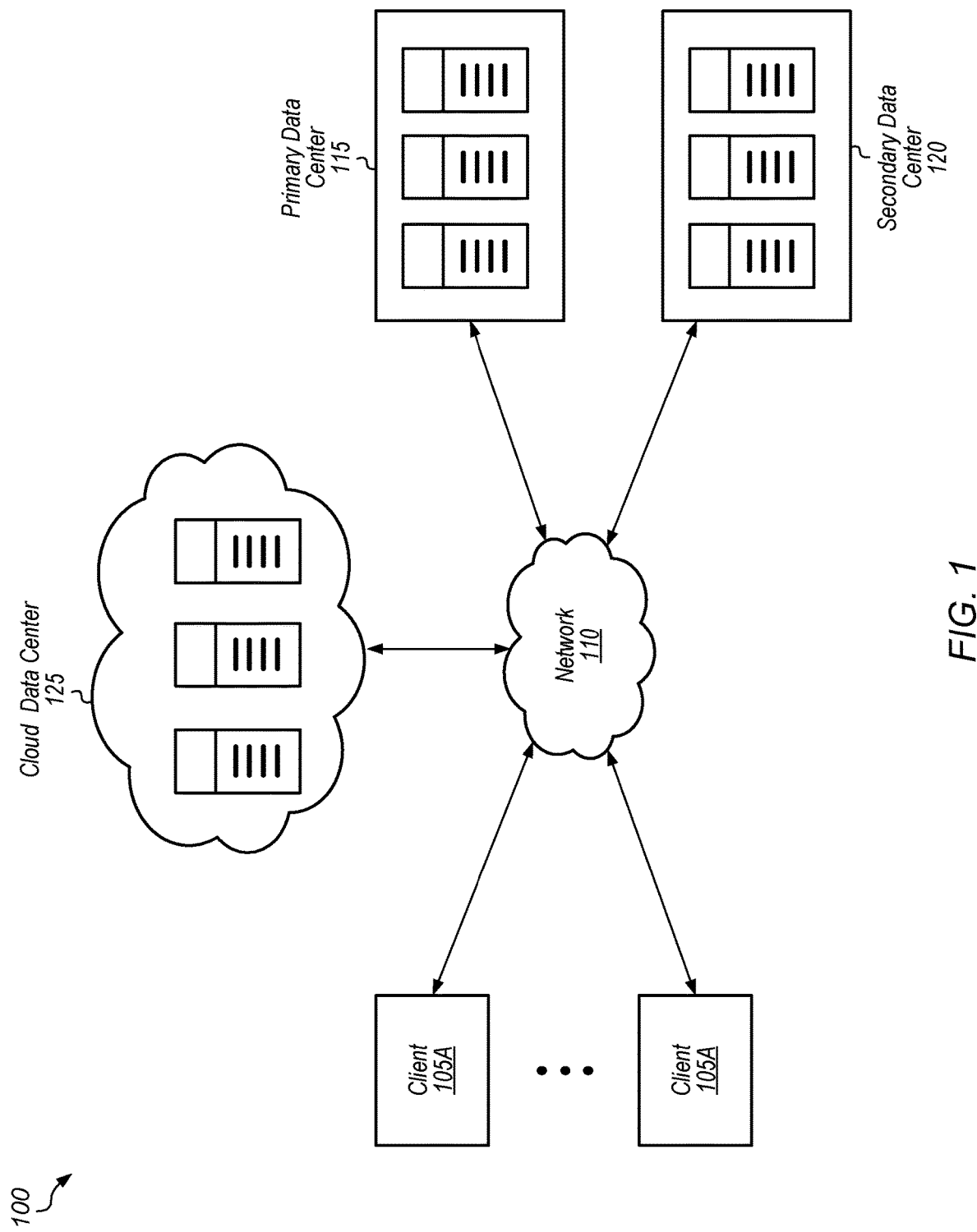
FIG. 1 is a block diagram of one embodiment of a system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a data center . . . ." Such a claim does not foreclose the system from including additional components (e.g., a processor, a display unit, a memory).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system 100 is shown. System 100 includes clients 105A-N, network 110, primary data center 115, secondary data center 120, and cloud data center 125. Primary data center 115 and secondary data center 120 are representative of any number and type of data centers which may be included within system 100. In one embodiment, primary data center 115 and secondary data center 120 are at different geographical locations. Primary data center 115 and secondary data center 120 can include any number and type of physical machines, such as computers and/or servers (e.g., database server, file server, application server), and any number and type of storage devices. The physical machines of primary data center 115 and secondary data center 120 include any number and type of processors for executing instructions to carry out the methods and mechanisms described herein. Primary data center 115 and secondary data center 120 can include any number of hosts, hosts with embedded scripts, virtual machines (VMs), databases, applications, and agents. Cloud data center 125 also can include any number of hosts, hosts with embedded scripts, virtual machines (VMs), databases, applications, and agents. It is noted that system 100 may include other components and/or the components may be arranged differently in other embodiments.

As used herein, the term "host" may be defined as a virtual machine, physical machine, operating system, application, or the like. Additionally, as used herein, the phrase "virtual machine" generally refers to a computing system platform that may not have direct correspondence to hardware of an underlying physical machine. For example, hardware of a physical machine may be abstracted to a virtual machine using a hypervisor or other virtualization software. A virtual machine may run a guest operating system and/or various other software applications.

In one embodiment, primary data center 115 is utilized as the main data center for hosting applications and other software for a company or other organization. Secondary data center 120 is utilized as a failover site for hosting the same applications and other software for the company. Additionally, cloud 125 is utilized as an additional failover site for hosting the same applications and other software. Cloud data center 125 is configured to offer cloud computing resources to the organization or company utilizing system 100. Cloud computing is the delivery of computing as a service where shared resources, software, and information are provided to computers and other devices over a network. Cloud computing provides computation, software, data access, and data storage services. Many cloud computing infrastructures consist of services delivered through shared data centers and appear as a single point of access. Cloud data center 125 may include a plurality of servers, including dynamically scalable or virtualized servers. In some embodiments, system 100 may only include cloud data center 125 as a single failover site and secondary data center 120 may not be included within system 100 in these embodiments.

Network 110 may be any type of network or combination of networks, including wireless connection, direct local area network (LAN), metropolitan area network (MAN), wide area network (WAN), a Public Switched Telephone Network (PSTN), an Intranet, the Internet, a cable network, a packetswitched network, a fiber-optic network, a router, storage area network, or other type of network. Examples of LANs include Ethernet networks, Fiber Distributed Data Interface (FDDI) networks, and token ring networks. Network 110 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 110.

Clients 105A-N are representative of any number of stationary or mobile computers such as desktop personal computers (PCs), servers, server farms, workstations, laptops, handheld computers, servers, personal digital assistants (PDAs), smart phones, tablets, wearable devices, and so forth. Generally speaking, clients 105A-N include one or more processors comprising one or more processor cores. Each processor core includes circuitry for executing instructions according to an instruction set architecture. The processor cores can access cache memory subsystems for data and computer program instructions. The cache subsystems can be coupled to a memory hierarchy comprising random access memory (RAM) and a storage device.

In one embodiment, a user or administrator creates a script for execution on a given host on primary data center 115. As used herein, the term "script" may be defined as a list of commands within a file that are capable of being executed without being compiled. Alternatively, a "script" may be defined as a sequence of instructions that are interpreted or carried out by another program. Still further, a "script" may be defined as a list of commands that are executed by a program or scripting engine. Scripts may be used to automate processes on a computer or within a virtual machine.

In one embodiment, a task for executing a script on a given host is generated. The task may be included within a user-generated plan. When the host is replicated from primary data center 115 to secondary data center 120 or cloud data center 125, the script is also replicated with the host. When the host is created on the secondary data center 120 or cloud 125 in response to a disaster recovery operation, a rehearsal event, or other event, the user-generated plan may be initiated. The task within the user-generated plan is then executed, causing the script to be executed on the host on the secondary data center 120 or cloud 125. An application executing on the secondary data center 120 or cloud 125 is configured to correlate identifiers (IDs) associated with the host on the primary data center 115 and in the new environment to cause the script to be executed on the host in the new environment. A disaster recovery event may include a migration, takeover, or other event.

Migration refers to a planned activity involving the graceful shutdown of virtual machines and applications at the primary data center 115 and starting them at secondary data center 120 (or cloud data center 125). Takeover refers to a user-initiated activity when primary data center 115 is down due to a disaster or other event, and the virtual machines and applications need to be restored at secondary data center 120 (or cloud data center 125) in order to provide business continuity.

Migration also refers to the planned transfer of the role of primary replication host from one data center or cluster to a remote data center or cluster. This transfer enables the application on the remote data center to actively use the replicated data. The former primary data center becomes free for maintenance or other activity. Takeover occurs when an unplanned event (e.g., disaster) causes a failure, making it necessary for the applications using the replicated data to be brought online on the remote data center.

Figure 2:
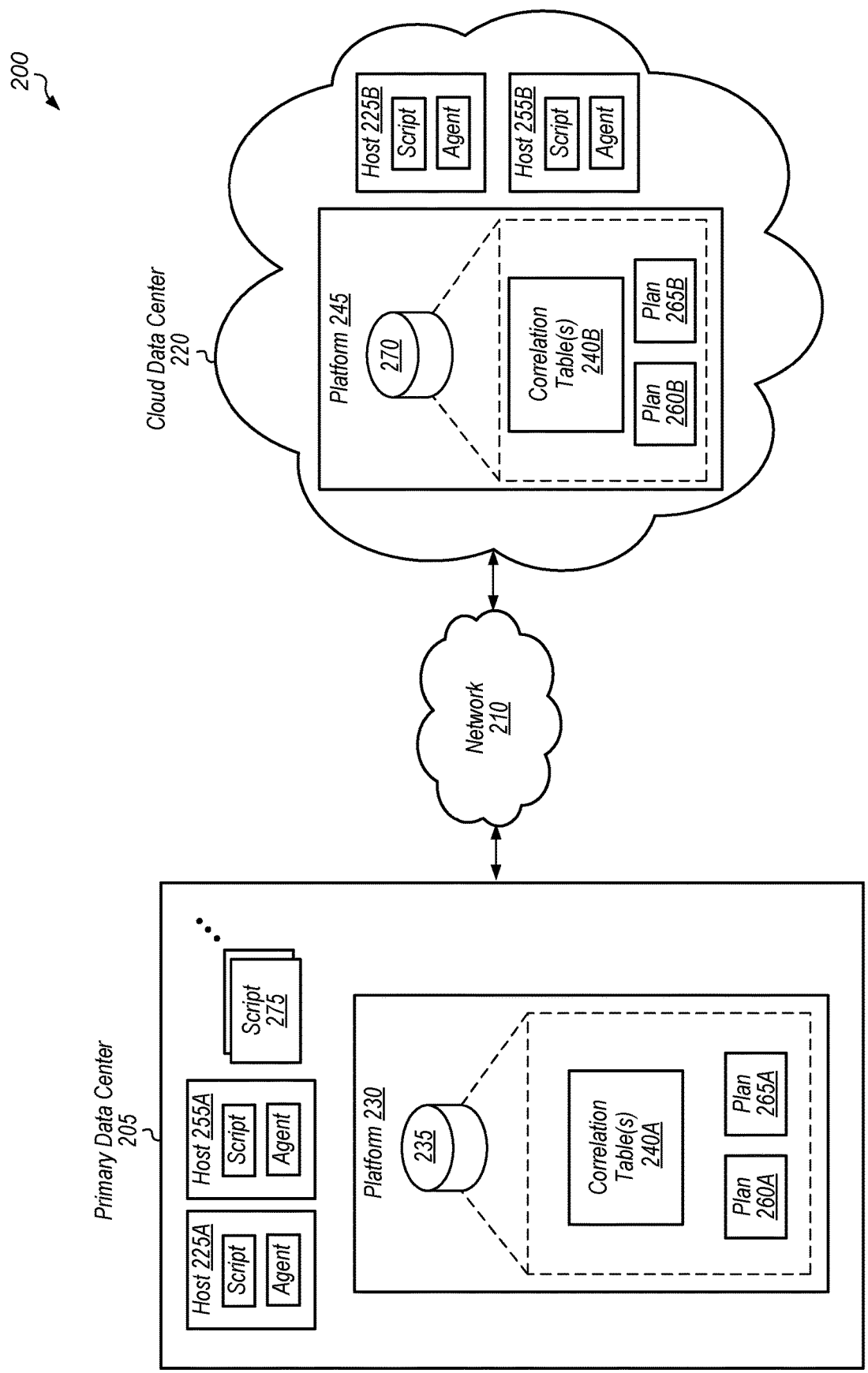
FIG. 2 is a block diagram of one embodiment of a system.

Referring now to FIG. 2, a block diagram of one embodiment of a system 200 is shown. System 200 includes primary data center 205, network 210, and cloud data center 220. Cloud data center 220 is representative of any type of secondary data center which is used by primary data center 205 as the target data center for disaster recovery operations. Network 210 is representative of any number and type of networks used to connect primary data center 205 and cloud data center 220. In one embodiment, primary data center 205 and cloud data center 220 are in different geographical locations. It is noted that system 200 may include any number of other data centers.

Primary data center 205 includes hosts 225A and 255A, platform 230, and script(s) 275. Platform 230 includes database 235, with database 235 including plans 260A and 265A and correlation table(s) 240A. Primary data center 205 may also include any number of other agents, software applications, platforms, databases, hosts, virtual machines, and the like which are not shown in FIG. 2 to avoid obscuring the figure. Cloud data center 220 includes platform 245, host 225B, and host 255B. Hosts 225B and 255B correspond to hosts 225A and 255A, respectively, on primary data center 205. Host 225B and host 255B each include scripts which were part of hosts 225A and 255A, respectively, on primary data center 205. Also, host 225B and host 255B each include agents which were part of hosts 225A and 255A, respectively, on primary data center 205.

In one embodiment, platform 230 is a software application which provides a resiliency platform for system 200 to manage data and applications during disaster recovery operations. The resiliency platform 230 generates a graphical user interface to allow a user or administrator to create and manage disaster recovery plans for the various software applications, hosts, virtual machines, etc. which are present in system 200. In one embodiment, platform 230 is configured to execute plans 260A and 265A for performing various actions and/or tasks (e.g., migrating hosts, replicating data, takeover operations) defined by a user. Plans 260A and 265A are representative of any number and type of user-generated plans for performing actions in response to disaster recovery operations, for rehearsing actions in preparation for future disaster recovery events, and for responding to other scenarios. In one embodiment, plans 260A and 265A are created by a user or administrator within a user interface generated by platform 230.

Script(s) 275 are representative of any number of scripts which exist within primary data center 205 but outside of any hosts. In one embodiment, responsive to detecting a user-generated request, platform 230 is configured to copy and assign script(s) 275 to one or more hosts 225A and 255A. Platform 230 is configured to generate a user interface to allow a user to assign one or more of script(s) 275 to one or more hosts 225A and 255A. For example, a script 275 may be created within primary data center 205 outside of a given host, and then the user may assign the script 275 to the given host, causing the script 275 to be part of the given host. In one embodiment, a user can assign script 275 to multiple hosts utilizing the user interface generated by platform 230. The user can generate a task within a plan to execute script 275 within the multiple hosts, and then when platform 230 or another platform executes the plan, the platform will communicate with agents within the multiple hosts to cause script 275 to be executed on the multiple hosts.

Platform 230 is configured to communicate with platform 245 over network 210. In one embodiment, platform 230 is configured to replicate correlation table(s) 240A and plans 260A and 265A to database 270 of platform 245 in cloud data center 220. The replicated versions of correlation table(s) 240A and plans 260A and 265A are shown as correlation table(s) 240B and plans 260B and 265B, respectively, in database 270. Database 270 of platform 245 may also include other plans, tables, or data replicated from database 235 of platform 230 of primary data center 205 and/or from other databases of other data centers.

Platform 230 is configured to communicate with hosts 225A and 255A via their respective agents. The agents shown in hosts 225A and 255A are representative of any number and type of software agents utilized for communicating with platform 230. In one embodiment, host 225A includes a custom script and host 255A includes a custom script. In one embodiment, the script included within host 225A is the same script as the script included within host 255A. In another embodiment, the script included within host 225A is different from the script included within host 255A. In one embodiment, a user generates a first task to execute the script on host 225A and the user generates a second task to execute the script on host 255A utilizing a graphical user interface generated by platform 230. The first task and second task may be included within plans 260A or 265A or another plan.

When a disaster recovery event occurs, platform 245 may bring up hosts 225B and 255B on cloud data center 230. In one embodiment, platform 245 may create VM templates for hosts 225B and 255B before the disaster recovery event occurs. Then, platform 245 may populate table(s) 240B with the correlations between source and target VMIDs for hosts 225B and 255B before the disaster recovery event occurs. Alternatively, in another embodiment, platform 245 may wait until the disaster recovery event occurs to dynamically create hosts 225B and 255B, and then platform 245 may populate table(s) 240B with the source and target VMIDs for hosts 225B and 255B after the disaster recovery event. When platform 245 executes plan 260B, plan 265B, or another plan which includes a task for executing scripts on host 225B or host 255B, the task will identify the host using the source VMID. Platform 245 will then retrieve the correlation between the source and target VMIDs stored in correlation table 240B, and then platform 245 will use the target VMID to identify the host for executing the script. Additionally, the UUID of the host will change on platform 245 from the UUID of the host on platform 230, and so platform 245 will use the new UUID of the host to communicate with the host's agent to cause the host to execute the script identified within the plan.

In one embodiment, correlation table(s) 240A-B are utilized by platforms 230 and 245 to track the different identifiers (IDs) assigned to hosts on different data centers. In one embodiment, correlation table(s) 240A-B store correlations between virtual machine IDs (VMIDs) and/or UUIDs. In one embodiment, the user generates a task to execute a script on a host before the host is created on a secondary data center. When the host is replicated to the secondary data center, the script is automatically replicated to the secondary data center as part of the host. Then, when the host is created on the secondary data center, the host has a second ID, with the second ID being different from the first ID of the host on the primary data center. Correlation table(s) 240A-B store the translations between host IDs on different data centers. Correlation table(s) 240A-B may also store the translations between UUIDs of hosts on different data centers. Correlation table(s) 240 may include any number of tables with any number of entries for storing ID translations for any number of hosts.

Referring now to FIG. 3, examples of correlation tables that may be utilized in accordance with one or more embodiments are shown. In one embodiment, tables 305, 310, and 315 are representative of correlation tables 240A-B (of FIG. 2). For example, tables 305, 310, and 315 may be stored in database 235 of platform 230 and database 270 of platform 245. Table 305 includes details of virtual machines as discovered from the hypervisors on the separate data centers. Table 310 includes details of the hosts as reported to the platform (e.g., platform 230 of FIG. 2) by the agents within the hosts.

Table 315 includes the source and target VMIDs for correlating a source VMID on the primary data center with a target VMID on the secondary data center. In one embodiment, a VM template for the target VM is created on the secondary data center before a disaster recovery event, and the ID from the VM template is used to populate the target VMID field of table 315 prior to the disaster recovery event. In another embodiment, the target VM is created dynamically in response to the disaster recovery event, and then the ID from the dynamically created target VM is used to populate the target VMID field of table 315 subsequent to the disaster recovery event.

In one embodiment, a platform detects a source VMID within a task of a given plan. The platform translates the source VMID into a target VMID retrieved using table 315, and then the platform determines the UUID of the target VMID from table 305. Then, additional details of the host may be retrieved from table 310 using the UUID from table 305. In other embodiments, tables 305, 310, and 315 may be organized differently and/or may include additional information.

In one embodiment, a plan generated on a primary data center includes a task to execute a script on a source VMID of "abcvm10_vmid". This plan is replicated from a primary data center to a secondary data center. Then, a platform on the secondary data center detects a condition (e.g., disaster recovery event) for executing the plan. Next, the platform on the secondary data center retrieves, from the correlation stored in table 315, the target VMID "abcvm10_vmid target" for the source VMID of "abcvm10_vmid" identified in the task. Then, the platform retrieves the UUID "abc_hostid_target" from the correlation stored in table 305 for the previously retrieved target VMID of "abcvm10_vmid target". Next, the platform communicates with the agent of the host using the UUID "abc_hostid_target" to cause the host to execute the script identified by the task in the plan.

Figure 4:
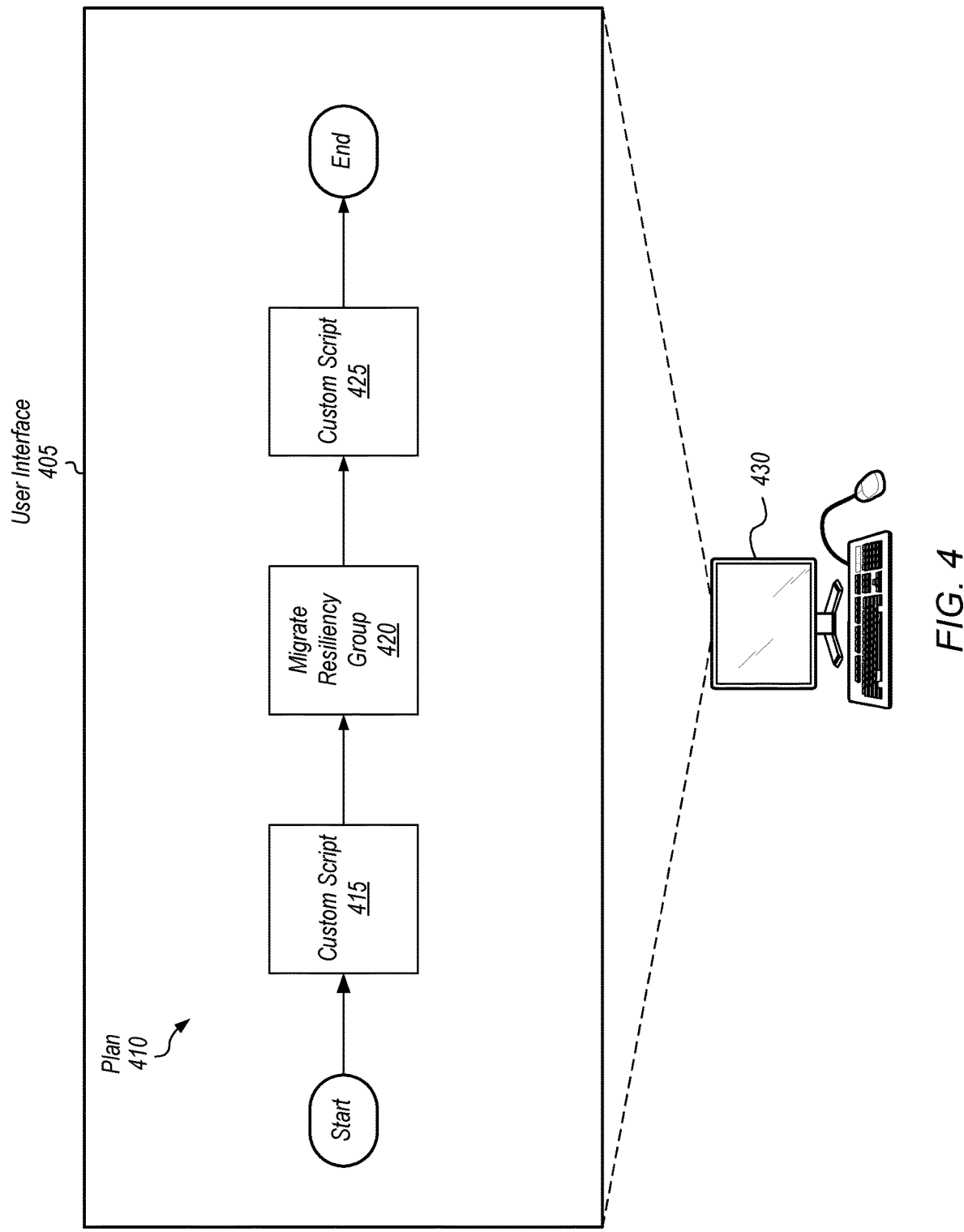
FIG. 4 is a diagram of one embodiment of a user interface for creating plans for resiliency groups.

Turning now to FIG. 4, a diagram of one embodiment of a user interface 405 for creating plans for resiliency groups is shown. User interface 405 can be generated by a disaster recovery platform, resiliency platform, or other application executing on computer system 430. Computer system 430 is representative of any type of computer system which includes one or more processors coupled to one or more memory devices, a display, one or more input devices, and/or other components. A user or administrator utilizes user interface 405 for creating plans to manage resiliency groups, respond to disaster recovery operations, execute scripts, and/or respond to other events or perform other actions.

In one embodiment, the user provides the administrative or root credentials of the host to a platform in order to enable the platform to establish communication with an agent within the host. For example, the user may provide the host name and the credentials to the platform, and then the credentials will be used to connect with the host's agent and establish authentication. Then, this authentication enables subsequent communication between the platform and the agent. Later, when the user changes the credentials of the host, the platform and the host's agent can continue to communicate using the previously established authentication. In one embodiment, the authentication may be based on a UUID, which may be generated based on a media access control (MAC) address of the host. The MAC address of the host will change when the host is migrated across data centers, and so the UUID of the host will change when the host is migrated.

In one embodiment, the certificate of the platform on the secondary data center is copied to the platform on the primary data center and included with the hosts on the primary data center. Accordingly, the certificate that is used to establish communication between the new platform and the agent on the secondary data center already exists on the host on the primary data center. When the primary data center goes down, the replicated information is used to bring the host up on the secondary data center. Once the host is up, the agent retrieves the certificate for the new platform, and the agent uses this certificate to establish authentication with the new platform. Once authentication is established, the agent is able to communicate with the new platform using the new UUID of the host. A VM template for a host is either created in advance or the VM template is created dynamically. When the host gets replicated to the secondary data center, the replicated data is assigned to that VM template, and the VM template is launched. Once the platform can communicate with the host, the platform detects a replicated plan. The new platform uses the correlation between the target VMID and the source VMID to identify the target VMID for executing the replicated plan. Once the target VMID is determined, the UUID of the host is also retrieved from a correlation table. Then, using the UUID to communicate with the host, the new platform will cause any scripts identified within the replicated plan to be executed on the host.

In one embodiment, plan 410 is a rehearsal plan for performing tasks, executing scripts, and/or checking the current status of one or more data centers of the system to ensure a resiliency group can be migrated in response to a disaster recovery event. In another embodiment, plan 410 is performed in response to an actual disaster recovery event. As shown in user interface 405, plan 410 starts with the custom script 415. In one embodiment, custom script 415 can stop one or more applications from running and make sure that replication of the virtual machines in a resiliency group have been stopped.

Next, the migrate resiliency group 420 task is performed in plan 410 after custom script 415. As used herein, a "resiliency group" is defined as a virtual entity which specifies a group of virtual machines. It may be assumed for the purposes of this discussion that a user has already created the corresponding resiliency group and specified which virtual machines belong to this resiliency group. Various actions can be performed on the resiliency group, affecting all virtual machines which belong to the resiliency group. By performing the migrate resiliency group 420 task, the virtual machines of the specified resiliency group are migrated from a first data center to a second data center.

Next, plan 410 includes custom script 425. Custom script 425 can be any type of script, binary, or executable created by a user or administrator to execute commands or perform various types of actions. In one embodiment, custom script 425 is executed on one of the hosts migrated as part of the migrate resiliency group 420 task. In one embodiment, custom script 425 launches one or more applications on the second data center after the migration. Custom script 425 can also perform one or more actions on the virtual machines of the migrated resiliency group. A user can select the host on which custom script 425 resides. This is shown in user interface 505 of FIG. 5. In other embodiments, plan 410 can include other numbers and arrangements of blocks representing other types of tasks or actions to be performed by the disaster recovery platform.

Figure 5:
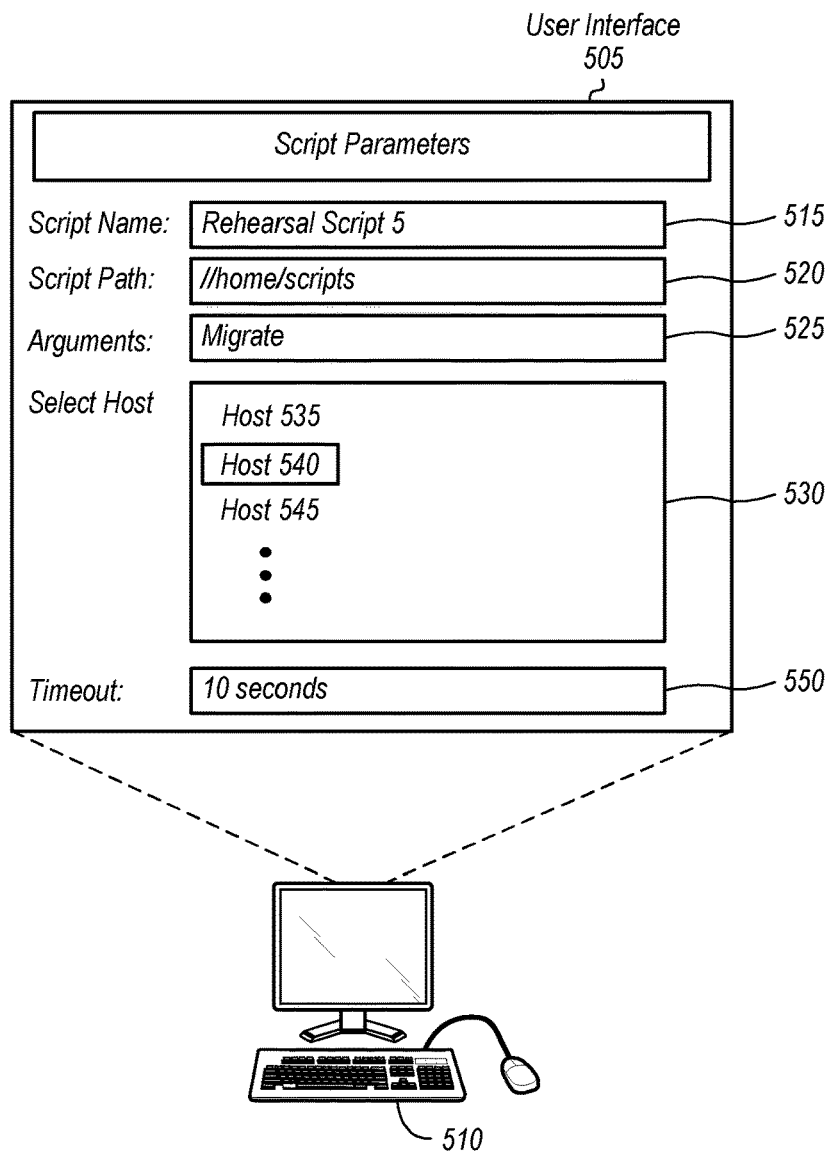
FIG. 5 is a diagram of one embodiment of a user interface for selecting script parameters.

Referring now to FIG. 5, a diagram of one embodiment of a user interface 505 for selecting script parameters is shown. In one embodiment, user interface 505 is generated by a resiliency platform application executing on computer system 510. Computer system 510 is representative of any type of computer system which includes one or more processors coupled to one or more memory devices, a display, one or more input devices, and/or other components.

Within user interface 505, the name of the script is specified in field 515, and the path of the script is specified in field 520. Any input arguments which the user specifies for passing to the script are entered in field 525. For example, in one embodiment, the user specifies passing the "Migrate" context to the script in field 525. In other embodiments, other arguments may be passed to the script in field 525.

The user selects the host on which the script resides in field 530. Hosts 535, 540, 545 are listed in field 530 with host 540 being selected. In another embodiment, user interface 505 may include a field for attaching a script to a host if the script is not already part of the host. It is noted that the user can select a host which is present on a first data center, and if the host is migrated to a second data center, the script will automatically be replicated with the host to the second data center. The user can also specify a timeout value in field 550. It is noted that user interface 505 is one example of a user interface which may be utilized in one embodiment for selecting script parameters. It should be understood that user interface 505 may be organized differently and/or user interface 505 may include one or more other fields in other embodiments.

Figure 6:
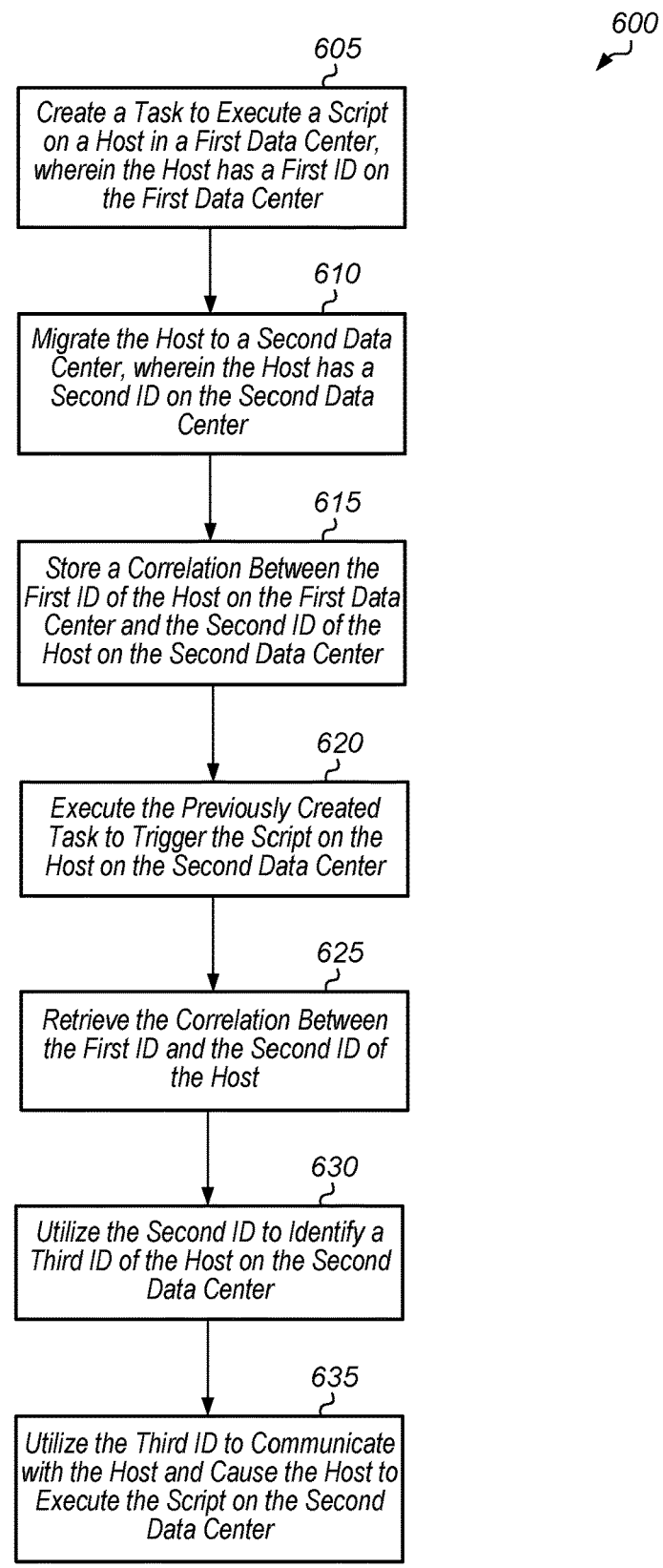
FIG. 6 is a generalized flow diagram illustrating one embodiment of a method for executing custom scripts within a host during disaster recovery operations.

Turning now to FIG. 6, one embodiment of a method 600 for executing custom scripts within a host during disaster recovery operations is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses or systems described herein may be configured to implement method 600.

A task to execute a script on a host in a first data center is created, wherein the host has a first identifier (ID) on the first data center (block 605). In one embodiment, the first ID is a VMID. In one embodiment, a resiliency platform application detects the creation of the task for executing the script on the host when a user or administrator generates a plan that includes the task. In one embodiment, a user or administrator generates the task for executing the script utilizing a user interface generated by the resiliency platform application. In one embodiment, the task for executing the script on the host is created while the host is active on the first data center. Next, the host is migrated to a second data center, wherein the host has a second ID on the second data center (block 610). In one embodiment, the second ID is a VMID, with the second ID being different from the first ID. In one embodiment, the second data center is a cloud data center.

The resiliency platform application stores a correlation between the first ID of the host on the first data center and the second ID of the host on the second data center (block 615). Next, a resiliency platform application on the second data center executes the previously created task to trigger the script on the host on the second data center (block 620). It is noted that the previously created task identifies the host with the first ID.

In response to executing the task, the resiliency platform application retrieves the correlation between the first ID and the second ID of the host (block 625). Then, the resiliency platform application utilizes the second ID to identify a third ID of the host on the second data center (block 630). In one embodiment, the third ID is a UUID of the host on the second data center. This UUID is different from the UUID of the host on the first data center. Then, the resiliency platform application utilizes the third ID to communicate with the host and cause the host to execute the script on the second data center (block 635). In one embodiment, the resiliency platform application utilizes the third ID to communicate with an agent within the host to cause the host to execute the script. After block 635, method 600 may end.

Figure 7:
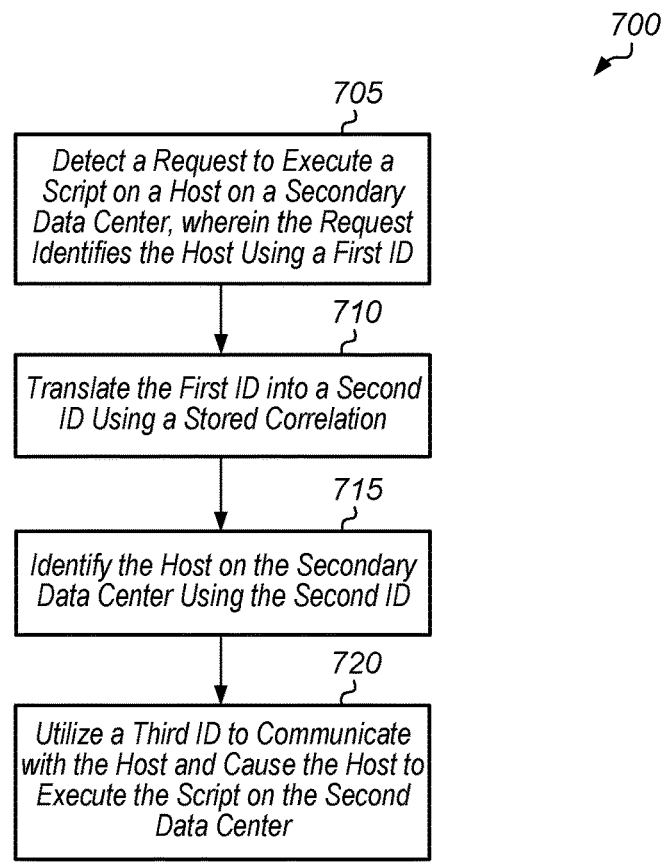
FIG. 7 is a generalized flow diagram illustrating another embodiment of a method for executing custom scripts within a host during disaster recovery operations.

Referring now to FIG. 7, another embodiment of a method 700 for executing custom scripts within a host during disaster recovery operations is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses or systems described herein may be configured to implement method 700.

A system detects a request to execute a script on a host on a secondary data center, wherein the request identifies the host using a first ID (block 705). In one embodiment, a task is generated while the host is active on a primary data center and before the host is created on the second data center. In one embodiment, the task is part of a user-created plan, with the user-created plan being generated utilizing a graphical user interface. Next, the system translates the first ID into a second ID using a stored correlation (block 710). Next, the system identifies the host on the secondary data center using the second ID (block 715). Then, the system utilizes a third ID to communicate with the host on the secondary data center to cause the host to execute the script on the secondary data center (block 720). In one embodiment, the third ID is correlated to the second ID using a correlation table. In one embodiment, the system utilizes a UUID to communicate with the host to cause the host to execute the script on the second data center, wherein the UUID is different from the second ID. After block 720, method 700 ends.

Figure 8:
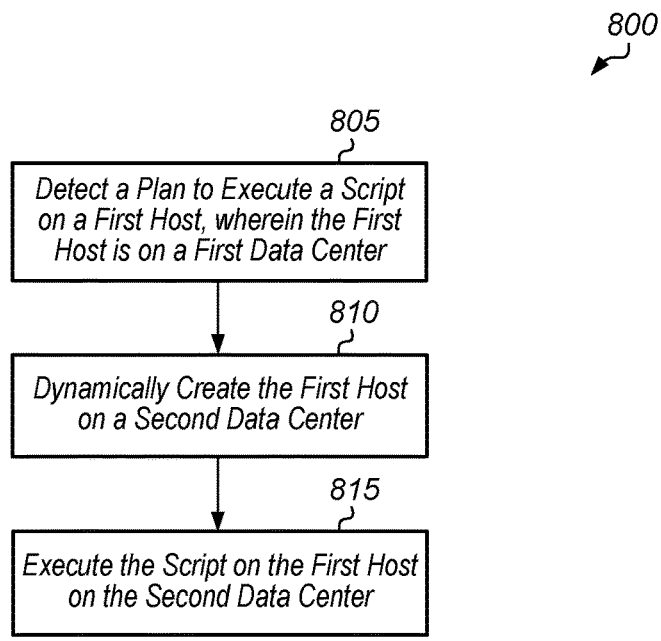
FIG. 8 is a generalized flow diagram illustrating one embodiment of a method for executing a user-defined plan.

Turning now to FIG. 8, another embodiment of a method 800 for executing a user-defined plan is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses or systems described herein may be configured to implement method 800.

A software application detects a plan to execute a script on a first host, wherein the first host is on a first data center (block 805). In one embodiment, the software application is a resiliency platform application. Next, the software application dynamically creates the first host on a second data center (block 810). The first host may be dynamically created on the second data center in response to a migration, a takeover, or other operation. In various embodiments, dynamically creating the first host on the second data center may include multiple steps. For example, in one embodiment, the steps include replicating the first host to the second data center, creating a virtual machine template on the second data center, assigning the replicated data to the virtual machine template, and then launching the virtual machine. In other embodiment, the steps may include any of the previously listed steps along with one or more other steps. In response to the first host being dynamically created on the second data center, the script is executed on the first host on the second data center (block 815). After block 815, method 800 may end.

Figure 9:
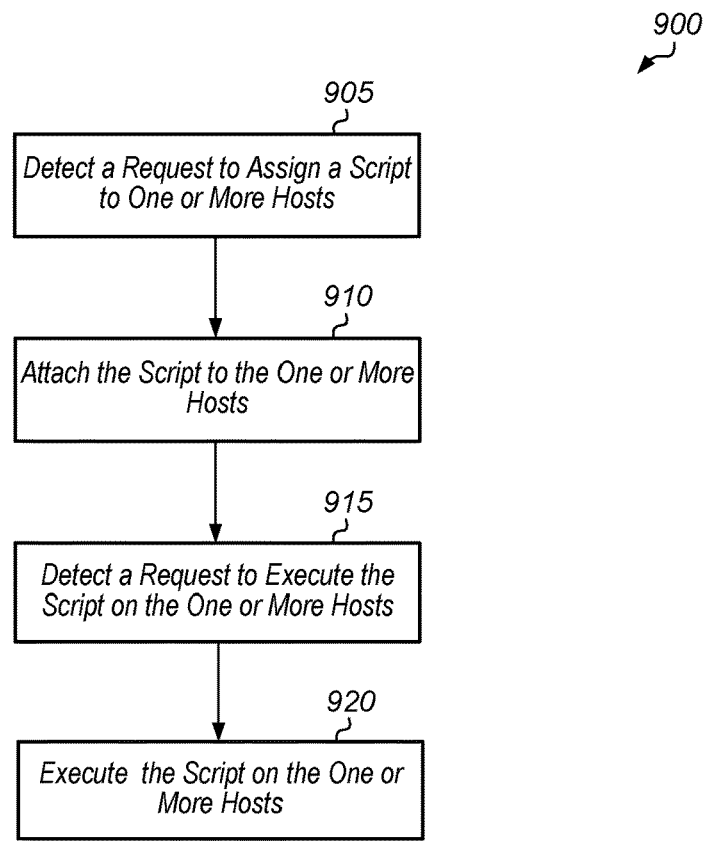
FIG. 9 is a generalized flow diagram illustrating one embodiment of a method for assigning a script to one or more hosts.

Referring now to FIG. 9, one embodiment of a method 900 for assigning a script to one or more hosts is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses or systems described herein may be configured to implement method 900.

A software application detects a request to assign a script to one or more hosts (block 905). In one embodiment, a user assigns the script to the one or more hosts within a user interface generated by the software application. For example, a user may create a task within a plan, with the task identifying the script and one or more hosts for executing the script. In response to detecting the request, the software application attaches the script to the one or more hosts (block 910). In other words, the script is copied onto the one or more hosts. In block 910, the script is made part of the one or more hosts such that when the one or more hosts are replicated to another data center, the script is automatically replicated as part of the one or more hosts.

Then, at a later point in time, the software application detects a request to execute the script on the one or more hosts (block 915). The request may be initiated on the original data center or a different data center from where the host(s) originally resided. Next, the software application executes the script on the one or more hosts (block 920). After block 920, method 900 may end.

Figure 10:
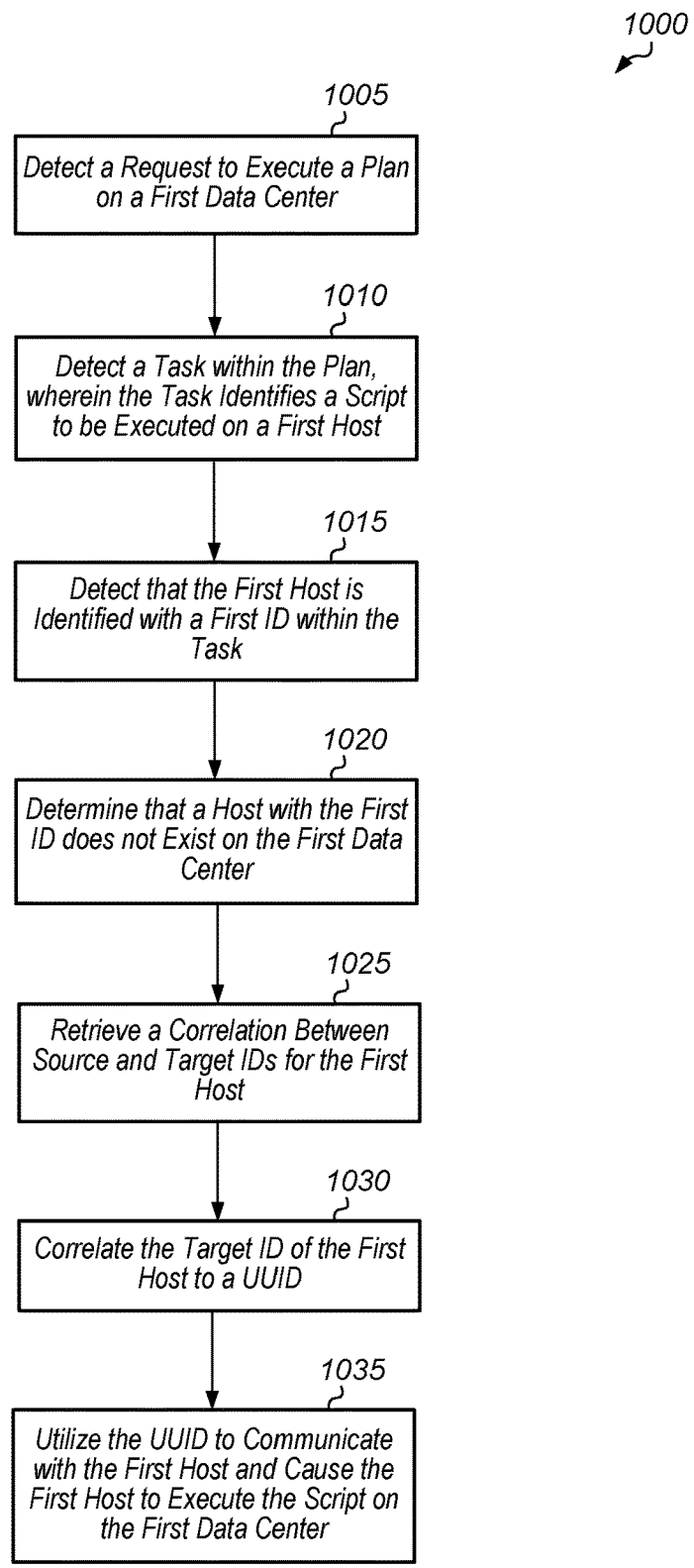
FIG. 10 is a generalized flow diagram illustrating one embodiment of a method for executing a user-defined plan.

Turning now to FIG. 10, one embodiment of a method 1000 for executing a user-defined plan is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses or systems described herein may be configured to implement method 1000.

A software application detects a request to execute a plan on a first data center (block 1005). In one embodiment, the plan was created on a second data center which is different from the first data center. Next, the software application detects a task within the plan, wherein the task identifies a script to be executed on a first host (block 1010). Then, the software application detects that the first host is identified with a first ID within the task (block 1015).

Next, the software application determines that a host with the first ID does not exist on the first data center (block 1020). In response to determining that a host with the first ID does not exist on the first data center, the software application retrieves a correlation between source and target IDs for the first host (block 1025). Then, the software application correlates the target ID of the first host to a UUID (block 1030). Next, the software application utilizes the UUID to communicate with the first host and cause the first host to execute the script on the first data center (block 1035). After block 1035, method 1000 may end.

Figure 11:
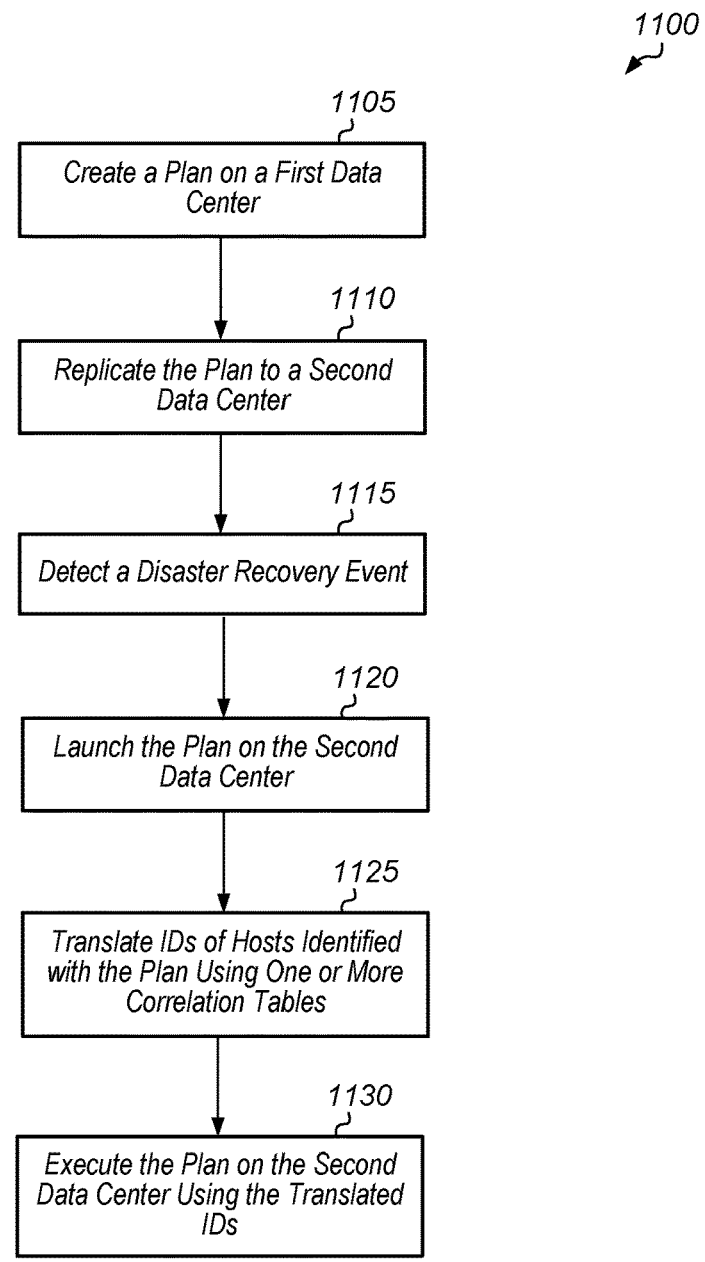
FIG. 11 is a generalized flow diagram illustrating another embodiment of a method for executing a user-defined plan.

Referring now to FIG. 11, another embodiment of a method 1100 for executing a user-defined plan is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses or systems described herein may be configured to implement method 1100.

A user creates a plan on a first data center (block 1105). Next, the plan is replicated to a second data center (block 1110). Then, a disaster recovery event is detected (block 1115). In response to detecting the disaster recovery event, the plan is launched on the second data center (block 1120). Next, IDs of hosts identified within the plan are translated using one or more correlation tables (block 1125). Then, the plan is executed on the second data center using the translated IDs (block 1130). After block 1130, method 1100 may end.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a network; and
   a plurality of data centers;
   wherein the system is configured to:
      detect a script within a first host on a first data center, wherein the first host has a first identifier (ID) in the first data center;
      migrate the first host and the script to a second data center, wherein the first host has a second ID in the second data center, wherein the second ID is different from the first ID;
      store a correlation between the first ID and the second ID of the first host in the second data center;
      detect a request to execute the script in the second data center, wherein the request indicates the script is to be executed on the first host and identifies the first host using the first ID;
      utilize the second ID to identify a second host on the second data center and cause the second host to execute the script on the second data center.

2. The system as recited in claim 1, wherein the system is further configured to:
   utilize the second ID to identify a third ID of the second host on the second data center;
   wherein the first ID and second ID are virtual machine identifiers and the third ID is a unique user identifier of the second host different from the first ID and the second ID.

3. The system as recited in claim 1, wherein in response to determining the first host with the first ID does not exist:
   access the stored correlation;
   determine the second ID corresponds to the first ID; and
   translate the first ID into the second ID using the stored correlation.

4. The system as recited in claim 2, wherein the system is further configured to:
   replicate the first host from the first data center to the second data center; and
   replicate the script to the second data center responsive to replicating the first host from the first data center to the second data center.

5. The system as recited in claim 1, wherein the system further comprises:
   a first table configured to store an association between virtual machine identifiers and host identifiers; and
   a second table configured to store one or more correlations between a source virtual machine identifier and a target virtual machine identifier, wherein said correlations include said correlation.

6. The system as recited in claim 2, wherein the system is configured to pass a context of a disaster recovery operation to the script as the script executes on the second host on the second data center.

7. The system as recited in claim 6, wherein the context indicates whether the disaster recovery operation is a migration or a takeover operation.

8. A method comprising:
   detecting a script within a first host on a first data center, wherein the first host has a first identifier (ID) in the first data center;
   migrating the first host to a second data center, wherein the first host has a second ID in the second data center, wherein the second ID is different from the first ID;
   storing a correlation between the first ID and the second ID of the first host in the second data center; and
   detecting a request to execute the script in the second data center, wherein the request indicates the script is to be executed on the first host and identifies the first host using the first ID;
   utilizing the second ID to identify the host on the second data center.

9. The method as recited in claim 8, further comprising:
   utilizing the second ID to identify a third ID of the second host on the second data center; wherein the first ID and second ID are virtual machine identifiers and the third ID is a unique user identifier of the second host different from the first ID and the second ID.

10. The method as recited in claim 8, wherein in response to determining the first host with the first ID does not exist, the method comprises:

accessing the stored correlation;
determining the second ID corresponds to the first ID; and
translating the first ID into the second ID using the stored correlation.

11. The method as recited in claim 9, further comprising:
replicating the first host from the first data center to the second data center; and
replicating the script to the second data center responsive to replicating the first host from the first data center to the second data center.

12. The method as recited in claim 9, further comprising detecting the request to execute the script on the first host on the second data center prior to the second host being created on the second data center, wherein the request is included within a user-generated plan.

13. The method as recited in claim 9, further comprising passing a context of a disaster recovery operation to the script as the script executes on the host on the second data center.

14. The method as recited in claim 8, further comprising
maintaining a first table configured to store an association between virtual machine identifiers and host identifiers; and
maintaining a second table configured to store one or more correlations between a source virtual machine identifier and a target virtual machine identifier, wherein said correlations include said correlation.

15. A non-transitory computer readable storage medium storing program instructions, wherein the program instructions are executable by a processor to:
detect a script within a first host on a first data center, wherein the first host has a first identifier (ID) in the first data center;
migrate the first host and the script to a second data center, wherein the first host has a second ID in the second data center, wherein the second ID is different from the first ID;
store a correlation between the first ID and the second ID of the first host in the second data center;
detect a request to execute the script in the second data center, wherein the request indicates the script is to be executed on the first host and identifies the first host using the first ID; and
utilize the second ID to identify a second host on the second data center and cause the second host to execute the script on the second data center.

16. The non-transitory computer readable storage medium as recited in claim 15, wherein the program instructions are further executable by a processor to:
utilize the second ID to identify a third ID of the second host on the second data center;
wherein the first ID and second ID are virtual machine identifiers and the third ID is a unique user identifier of the second host different from the first ID and the second ID.

17. The non-transitory computer readable storage medium as recited in claim 16, wherein the second data center is a cloud computing environment.

18. The non-transitory computer readable storage medium as recited in claim 16, wherein the program instructions are further executable by a processor to:
replicate the first host from the first data center to the second data center; and
replicate the script to the second data center responsive to replicating the first host from the first data center to the second data center.

19. The non-transitory computer readable storage medium as recited in claim 16, wherein the program instructions are further executable by a processor to pass a context of a disaster recovery operation to the script as the script executes on the host on the second data center.

20. The non-transitory computer readable storage medium as recited in claim 19, wherein the program instructions are further executable to:
maintaining a first table configured to store an association between virtual machine identifiers and host identifiers; and
maintaining a second table configured to store one or more correlations between a source virtual machine identifier and a target virtual machine identifier, wherein said correlations include said correlation.

* * * * *